United States Patent Office 3,293,194
Patented Dec. 20, 1966

3,293,194
POLYMERIZATION OF DISILACYCLOBUTANE IN THE PRESENCE OF A PLATINUM CATALYST
John Cormack Lovie, Irvine, and James Alastair Crichton Watt, Fairlie, Scotland, assignors to Imperial Chemical Industries Limited, London, England, a corporation of Great Britain
No Drawing. Filed Feb. 1, 1965, Ser. No. 429,662
Claims priority, application Great Britain, Feb. 14, 1964, 6,267/64
4 Claims. (Cl. 260—2)

This invention relates to a new and improved process for the preparation of polymeric organosilicon compounds.

A wide variety of polymeric organosilicon compounds are known and are readily available. Among these materials are the silmethylene polymers, i.e., polymers having a chain of alternating silicon atoms and methylene groups. These polymers have hitherto been prepared by a variety of methods, for example, such as condensation of a lithium derivative of an alkylsilicon compound with a halosilicon compound or a Grignard or Wurtz-Fittig synthesis.

According to the present invention a new and improved process for the production of silmethylene polymers comprises polymerising a substituted disilacylobutane of the general formula

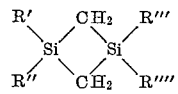

wherein the groups R', R'', R''' and R'''', which may be the same or different, are monovalent organic or organosilicon groups, halogen or hydrogen atoms, in the presence of a platinum catalyst as hereinafter defined.

By the phrase "a platinum catalyst" as used herein we mean a simple or complex salt of a platinnum metal, for example, such as platinous bromide, platinous chloride, chloroplatinic acid, di-$\mu$-chloro-dichlorobis(cyclohexane) diplatinum (11), di-$\mu$-chloro-dichlorobis(decene) diplatinum (11), bis(diethylsulphide)dichloroplatinum (11), dimethylbis(triphenylphosphine)platinum (11), bis(tripropylarsine)dichloroplatinum (11), methylbis(trimethylphosphine)bromoplatinum (11), bis(tripropylphosphine) dichloroplatinum (11), sodium chloroplatinate, di-$\mu$-chlorodichloro-bis(tributylphosphine)diplatinum (11), palladous bromide, palladous chloride, bis(triphenylphosphine) dichloropalladium (11), di-$\mu$-chloro-dichlorobis(triethylphosphine)dipalladium (11), ruthenium trichloride, iridium trichloride and iridium hydroxide. Catalysts which can readily be dissolved or dispersed in the disilacyclobutane are normally preferred. Catalysts in which the platinum metal is platinum are also in general preferred. It is further preferred that the catalyst be a complex of an olefin and for many purposes the preferred olefin is cyclohexene.

The groups R', R'', R''' and R'''' in the silacylobutane may be alkyl, aryl, aralkyl, alkoxy, aryloxy, siloxy or silalkylene groups or halogen or hydrogen atoms. Suitable groups include, for example, methyl, ethyl, benzyl, phenyl, trimethylsiloxy and trimethylsilylmethyl groups.

The catalyst may be present in widely varying proportions, for example, from less than 0.001 to 0.1 part by weight or more of platinum metal per part of the substituted disilacycyclobutane. It is, however, in general preferred to use the catalysts in amounts of the order of from 0.002 to 0.02 part of metal per part of the disilacyclobutane.

The polymerisation may be carried out over a wide range of temperature, for example, from 10 to 200° C. It is, however, in general satisfactory and is preferred to operate at temperatures of the order of 50 to 120° C. The reaction may also be carried out over a wide range of pressures. It is, however, normally preferred to operate at atmospheric pressure.

If desired the reaction may be carried out in the presence of a solvent, for example, such as hexane, benzene, toluene or tetrahydrofuran. If a solvent is used it may be present in amounts up to, for example, 100 parts by weight per 100 parts by weight of the disilacyclobutane.

If desired the catalyst may be separated from the resulting polymer. One method of achieving this is by adding active charcoal to a solution of the polymer in a solvent, filtering the mixture and distilling off the solvent.

The products of our invention can be used in a wide variety of applications, for example, as hydraulic fluids, as lubricants and as bases for elastomers.

Our invention is further illustrated by the following examples in which all parts are by weight.

Example 1

1 part of di-$\mu$-chloro-dichlorobis(cyclohexane)diplatinum (11) was added to 500 parts of 1,1,3,3-tetramethyl-1,3-disilacyclobutane and the mixture heated at 70° C. for 2 minutes. A vigorous reaction ensued as a result of which there was obtained a dark coloured polymeric material. This was dissolved in 1000 parts of benzene and the solution heated under reflux with 10 parts of decolourising charcoal for 5 minutes. The solution was then filtered and the solvent removed by distillation whereby there was obtained 450 parts of a viscous colourless material of viscosity 100 cs. at 20° C., refractive index 1.465 at 18° C., S.G. 0.8 and which was insoluble in water and soluble in organic solvents such as benzene. This material was of value as a lubricant, a hydraulic fluid, an additive for silicone greases, a constituent of water repellent compositions and as an insulator in electrical applications.

Example 2

1 part of chloroplatinic acid was added to 500 parts of 1,1,3,3-tetramethyl-1,3-disilacyclobutane and the mixture heated at 70° C. for 2 minutes. There was thus obtained 480 parts of a syrupy liquid of viscosity 300 cs. at 20° C.

Example 3

1 part of bis(diethylsulphide)dichloroplatinum (11) was added to 500 parts of 1,1,3,3-tetramethyl-1,3-disilacyclobutane and the mixture heated at 70° C. for 2 minutes. There was thus obtained 490 parts of a liquid of viscosity 100 cs. at 20° C. This material was of value as an electrical insulator and as a lubricant.

Example 4

1 part of di-$\mu$-chloro-dichlorobis(cyclohexene)diplatinum (11) and 500 parts of 1,3-diethoxy-1.3-dimethyl-1,3-disilacyclobutane were warmed to 70° C. for 5 minutes, allowed to cool and maintained at 20° C. for 2 days. Thereafter the mixture was warmed to 60° C. at 0.02 mm. Hg pressure, whereby there were obtained 495 parts of a polymeric gum, the I.R. spectra of which showed the disappearance of the band at 10.55$\mu$.

Example 5

1 part of di-$\mu$-chloro-dichlorobis(cyclohexene)diplatinum (11) and 500 parts of 1,3-dimethyl-1,3-diphenyl-1,3-disilacyclobutane were reacted in the manner described in Example 4. There were thus obtained 475 parts of a clear yellow/brown viscous liquid.

Example 6

2 parts of di-$\mu$-chloro-dichlorobis(decene)diplatinum (11), 500 parts of 1,1,3,3-tetramethyl-1,3-disilacyclobutane and 500 parts of 1,3-diethoxyl-1,3-dimethyl, 1,3-disilacyclobutane were heated to 60° C. There was an immediate vigorous exothermic reaction, giving a product consisting of 980 parts of a viscous liquid. The I.R. spectra showed strong bands at 8.6 and 9.05µ attributable to Si-OEt groups.

*Examples 7 to 20*

500 parts of 1,1,3,3-tetramethyl-1,3-disilacyclobutane were heated with 1 part of the specified catalysts in the manner described in the following table:

| Example | Catalyst | Heating | | Product |
|---------|----------|---------|---------|---------|
| | | Time (min.) | Temp. (° C.) | |
| 7 | Platinous bromide | 2 | 70 | Gum. |
| 8 | Dimethylbis(triphenylphosphine)platinum (11). | 30 | 120 | Do. |
| 9 | Bis(tripropylarsine)dichloroplatinum (11). | 60 | 120 | Viscous fluid. |
| 10 | Methylbis(trimethylphosphine)bromoplatinum (11). | 180 | 120 | Do. |
| 11 | Bis(tripropylphosphine)dichloroplatinum (11). | 30 | 120 | Gum. |
| 12 | Sodium chloroplatinate | 120 | 120 | Viscous liquid. |
| 13 | Di-Y-µ-chloro-dichlorobis(tributyl phosphine)diplatinum (11). | 5 | 80 | Very viscous liquid. |
| 14 | Palladous bromide | 5 | 120 | Gum. |
| 15 | Palladous chloride | 5 | 120 | Do. |
| 16 | Bis(triphenylphosphine)dichloropalladium (11). | 60 | 120 | Powdery gum. |
| 17 | Di-µ-chloro-dichloro-bis(trimethylphosphine)dipalladium (11). | 120 | 120 | Do. |
| 18 | Ruthenium trichloride | 25 | 110 | Clear gum. |
| 19 | Iridium hydroxide | 10 | 120 | Clear viscous liquid. |

What we claim is:

1. A process for the production of silmethylene polymers comprising polymerising a substituted disilacyclobutane of the general formula

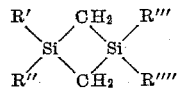

wherein the groups R', R'', R''' and R'''', which may be the same or different, are selected from the group consisting of lower alkyl, lower alkoxy and phenyl radicals, and halogen and hydrogen atoms, in the presence of simple and complex salts of a platinum metal catalyst selected from the group consisting of platinous bromide, platinous chloride, chloroplatinic acid, di-µ-chlorodichlorobis(cyclohexene)diplatinum (11),
di-µ-chloro-dichlorobis(decene)-diplatinum (11),
bis(diethylsulphide)dichloroplatinum (11),
dimethylbis(triphenylphosphine)platinum (11),
bis(tripropylarsine)dichloroplatinum (11),
methylbis(trimethylphosphine)bromoplatinum (11),
bis(tripropylphosphine)dichloroplatinum (11),
sodium chloroplatinate,
di-µ-chloro-dichlorobis(tributylphosphine)diplatinum (11),
palladous bromide,
palladous chloride,
bis(triphenylphosphine)dichloropalladium (11),
di-µ-chlorodichlorobis(triethylphosphine)dipalladium (11),
ruthenium trichloride,
iridium trichloride and
iridium hydroxide.

2. A process according to claim 1 wherein R', R'', R''', R'''' are selected from the group consisting of methyl, phenyl, and ethoxy groups.

3. A process according to claim 1 wherein the catalyst is used in an amount of from 0.001 to 0.1 part by weight of platinum metal per part of disilacyclobutane.

4. A process according to claim 1 where the polymerisation is carried out at a temperature of from 10 to 200° C.

References Cited by the Examiner

UNITED STATES PATENTS

| 2,381,000 | 8/1945 | Patnode et al. | 260—448.2 |
| 2,483,972 | 10/1949 | Goodwin | 260—448.2 |
| 2,590,937 | 4/1952 | Clark | 260—448.2 |
| 2,850,514 | 9/1958 | Knoth | 260—448.2 |
| 3,178,392 | 4/1965 | Kriner | 260—448.2 |

LEON J. BERCOVITZ, *Primary Examiner.*

DONALD E. CZAJA, *Examiner.*

M. I. MARQUIS, *Assistant Examiner.*